(12) United States Patent
Messina

(10) Patent No.: US 7,277,116 B1
(45) Date of Patent: Oct. 2, 2007

(54) METHOD AND APPARATUS FOR AUTOMATICALLY CONTROLLING VIDEO CAMERAS USING MICROPHONES

(76) Inventor: Antonio Messina, Via Oberdan, 6, 40126 Bologna (IT)

( * ) Notice: Subject to any disclaimer, the term of this patent is extended or adjusted under 35 U.S.C. 154(b) by 0 days.

(21) Appl. No.: 09/720,508

(22) PCT Filed: Jul. 2, 1999

(86) PCT No.: PCT/IB99/01233

§ 371 (c)(1),
(2), (4) Date: Dec. 27, 2000

(87) PCT Pub. No.: WO00/02388

PCT Pub. Date: Jan. 13, 2000

(30) Foreign Application Priority Data

Jul. 3, 1998 (IT) ................................. B098A0410

(51) Int. Cl.
*H04N 7/14* (2006.01)
(52) U.S. Cl. ................ 348/14.08; 348/14.09; 348/14.01
(58) Field of Classification Search .. 348/14.01–14.08, 348/14.09, 211.6, 14.3, 552; 381/92, 91, 381/122, 71.1, 110
See application file for complete search history.

(56) References Cited

U.S. PATENT DOCUMENTS

| 5,535,288 | A | 7/1996 | Chen et al. |
| 5,778,082 | A * | 7/1998 | Chu et al. ..................... 381/92 |
| 6,469,732 | B1 * | 10/2002 | Chang et al. ............ 348/14.08 |
| 6,826,284 | B1 | 11/2004 | Benesty et al. |

FOREIGN PATENT DOCUMENTS

| EP | 0 689 356 A2 | 12/1995 |
| WO | WO97/08896 | 3/1997 |
| WO | WO97/43856 | 11/1997 |

OTHER PUBLICATIONS

International Search Report, dated Sep. 8, 1999.

* cited by examiner

*Primary Examiner*—Melur Ramakrishnaiah
(74) *Attorney, Agent, or Firm*—Fay, Sharpe, Fagan, Minnich & McKee, LLP

(57) ABSTRACT

The invention relates to a method and apparatus for controlling video cameras (15, 16) using microphones (10) where the space-time coordinates of a sound event are calculated by first estimating with high precision the time delays of arrival for select microphone pairs, and then applying the Total Least Squares method.

20 Claims, 3 Drawing Sheets

METHOD AND APPARATUS FOR AUTOMATICALLY CONTROLLING VIDEO CAMERAS USING MICROPHONES

TECHNICAL FIELD

The present invention relates to a method and apparatus for automatically controlling video cameras using microphones. In particular, the invention concerns a method and apparatus for locating sound sources and directing a video camera at them.

BACKGROUND ART

Equipment of this kind can be used in video-teleconferencing systems or in systems for the surveillance of controlled access areas, whether indoors or outdoors. The control of these systems is very complex, owing to the multiplicity of the acoustic signals produced by the environment, background noise and the size of the area controlled, which generally make it impossible for a human operator to distinguish the useful information from the useless.

In an automatic apparatus, the video camera is driven by a sound source location system which works by processing the signals generated by microphones. Many well-known systems use microphone arrays to capture acoustic signals and apply to the sampled signals digital processing methods based on the estimation of the time delay of arrival of the sound wavefront across select microphone pairs (hereinafter also referred to as "time delay" for short) [see C. H. Knapp, G. C. Carter, *The generalized correlation method for estimation of time delay*, IEEE Transaction on Acoustic Speech and Signal Processing, Bol. ASP-24, No. 4, August 1976].

Known location systems permit estimation of the position of the sound source in space but do not provide any information about the time sequence of the acoustic events. This constitutes a serious shortcoming for systems where it is necessary to reconstruct the order in which events have taken place (for example, requests to speak by participants at a conference).

DISCLOSURE OF THE INVENTION

For this reason, the present invention has for its main aim to provide an apparatus capable of directing one or more video cameras at a source of acoustic events by precisely identifying not only the position of the source in space but also the temporal sequence of the events.

Another aim of the present invention is to provide a method and an apparatus in which the sound source is located using a time delay estimation method that is particularly advantageous from the computational viewpoint.

Yet another aim of the invention is to provide a system for automatically controlling video cameras with microphones that is easy and economical to produce using current digital processing devices.

The above mentioned aims are achieved by a method and apparatus as described in the claims herein.

In a particularly advantageous embodiment, the signals generated by a plurality of microphones when they detect a sound source are processed by a first unit in order to estimate the time delay of arrival of the sound wavefront across select microphone pairs. A second unit then calculates both the space and time coordinates of the event, and, as a function of these, directs one or more video cameras at the source.

A first aspect of the invention provides a particularly advantageous method for estimating the time delay $\Delta_{ij}=t_i-t_j$ for a select microphone pair (i, j). It is known that if the Fourier transform of the signal s(t) is expressed as $S(\omega)$ and assuming that the signal is considerably more intense than noise at all frequencies, then the cross correlation of the signal at two microphones $s_i(t)$ and $s_j(t)$ has a maximum for $\Delta_{ij}$. In the cases considered, the best way of calculating $\Delta_{ij}$ is as follows:

perform the Fourier transform on the cross correlation of the two signals (that is, calculate its cross-power spectrum);

extract the phase through normalization by magnitude; and perform the inverse transform.

This procedure identifies a peak centred at $\Delta_{ij}$ well described by a Dirac delta function if the previous phase extraction step is properly normalized, for example, as follows:

$$\frac{S_i S_j^*}{|S_i||S_j^*|} = e^{-i\omega\Delta_{ij}} \qquad (i)$$

In actual fact, the hypotheses described above are optimistic approximations because the sound source is not usually stationary and the energy of the signal is not always greater than noise at all frequencies. Also, the automation of a process which estimates the time delay across two microphones is based on signal digitization and sampling, thus introducing a discrete aspect for the signal. The above expression is thus modified as follows:

$$\frac{S_i(\omega_k)S_j^*(\omega_k)}{|S_i(\omega_k)||S_j^*(\omega_k)|} = e^{-i\omega_k\Delta_{ij}}, k \in [-N/2, +N/2] \qquad (ii)$$

where N is the number of samples.

However, this expression does not satisfy the sampling theorem, which guarantees that the value of the function $s_i(t)$ at any point in an interval, can be obtained by the values sampled on the grid points if the function is band limited, that is to say, if its Fourier transform is not zero only on a limited interval.

One proposed way of overcoming this problem (see Rabinkin et al., *A DSP implementation of source location using microphone arrays*, Proc. Acoustical Society of America, Indianapolis, Ind., USA, 15 May 1996) is to extract the phase in the frequency domain by normalizing the Fourier transform of the cross correlation with a power p∈]0,1[ of the product of the amplitudes of the signals on the two microphones. When p=0, the cross correlation is not normalized, when p=1, the classical formula is obtained. The optimum value is determined experimentally. The disadvantage of this procedure is that it cannot be standardized for any environment.

The method disclosed by the present invention, on the other hand, uses the product of the classical Fourier cross correlation formula with a normalized function tending smoothly to zero on the boundary of the interval. This function is preferably constituted by a Gaussian function. The procedure has two advantages: it eliminates noise for high values of ω and permits greater precision in determining the cross correlation peak, after performing the inverse Fourier transform, thanks to the transformation properties of the Gaussian function.

In the continuous case, the procedure is equivalent to applying a filter to the normalized cross correlation, as follows:

$$e^{-i\omega\Delta_{ij}}e^{-\omega^2/2\sigma_\omega^2} \quad \text{(iii)}$$

which, if the inverse Fourier transform is applied to it, provides the convolution of a Dirac delta function with a Gaussian function and hence a Gaussian function centred at $\Delta_{ij}$, $$\delta(t-\Delta_{ij})e^{-t^2/2\sigma_t^2} = e^{-(t-\Delta_{ij})^2/2\sigma_t^2} \quad \text{(iv)}$$

If the above solution is applied to the discrete case, the interpolation of the Gaussian function stored as a table of point values (without requiring that the peak be at a sampling point) provides a very accurate estimation of the position of the cross correlation maximum of the signal for the microphone pair (i, j), and, therefore, of the time delay of arrival of the sound wavefront (with an error of approximately $10^{-6}$ seconds with sampling at 22 KHz). Moreover, using the same hardware, the procedure disclosed herein permits faster computation times than known techniques.

In a second aspect, the invention also provides a particularly advantageous technique for localizing the sound event in space and time. Indeed, the determination of the space-time coordinates of a sound event, produced at time $t_s$ within a volume defined by a system of orthonormal coordinates (O,x,y,z), can be reduced, without plane wave approximation, to the solution of a linear equation system that can be expressed as vectors in the form:

$$A\xi = b, A \in R^{m \times 4}, \xi \in R^4, b \in R^m, m \geq 5 \quad \text{(v)}$$

where A is the coefficient matrix, b the known term that depends on the space coordinates and on the time delays $\Delta_{j1}$ of arrival of the sound wavefront on the microphones with reference to an arbitrarily selected microphone, m the number of microphones used, and $\xi \equiv (x,y,z,t_s)$ the vector of the four unknown terms in the sequence.

Since both A and b depend on the positions of the microphones and on the time delays, the presence of possible fluctuations in the values of all the system coefficients, due to uncertainty in the measurement of the relative positions of the microphones, to the speed of sound and to the measurement of time lead to absolute errors that cannot be estimated with traditional methods such as the LU method.

A singular value decomposition (SVD) technique for solving the least squares problem associated with the linear problem (LS problem—see G. H. Golub, C. F. Van Loan, *Matrix Computation*, 2nd ed., Johns Hopkins University Press, Baltimore, Md., 1989) using normalized coefficients, considerably improves the dependence of the solution on data perturbation. However, even in this case, the maximum absolute error (upper bound) in determining the position of the source may reach values in the order of magnitude of the norm of the source vector (dozens of meters). Further, the fluctuations introduce zones in which the problem becomes inconsistent. In classical methods for dealing with perturbations on the SVD method (see A. K. Louis, *Inverse und schlect gestellte Probleme*, TU Berlin, Ed. G. B. Teuber, Stuttgart, 1989) such as, for example, band filters and Tikhonov-Phillips regularization, the matrix A and the possibility of perturbations on the vector b must be known exactly. These methods are therefore unsuitable to deal with the problem at hand.

In a particularly advantageous embodiment of the invention, the estimate of the space-time coordinates of the sound event is obtained by the Total Least Squares (TLS) method (see S. Van Huffel, J. Vandewalle, *The Total Least Squares Problem: Computational Aspects and Analysis*, Frontiers in Applied Mathematics, Ed. SIAM, Philadelphia, 1991), which does not appear to have ever been used in this context. Supposing that the rows of the perturbation matrix are stochastically independent and distributed in identical manner with mean zero (without making any supposition as to the type of error distribution) and that the covariance matrix of the matrix rows is proportional to the identity matrix, it can be shown that the TLS method is more stable than the LS method and other linear regression methods (supposing further that the fluctuations of the coefficients do not exceed certain critical values).

Moreover, it is known that the maximum error in the TLS method, because it consists of a 2-norm of space-time coordinates, oscillates between zero and this maximum value, but tends mainly to assume an intermediate value. With different microphone arrangements, the time delay can also be estimated with other known methods, such as triangulation techniques for the estimation of positions, used in combination with the procedure described above.

Further advantages and technical characteristics of the present invention are described in more detail below, with reference to the accompanying drawings, which illustrate a preferred embodiment of the invention without restricting the scope of the inventive concept, and in which:

FIG. 1 schematically illustrates a preferred embodiment of an apparatus made according to the present invention;

Figure 1:
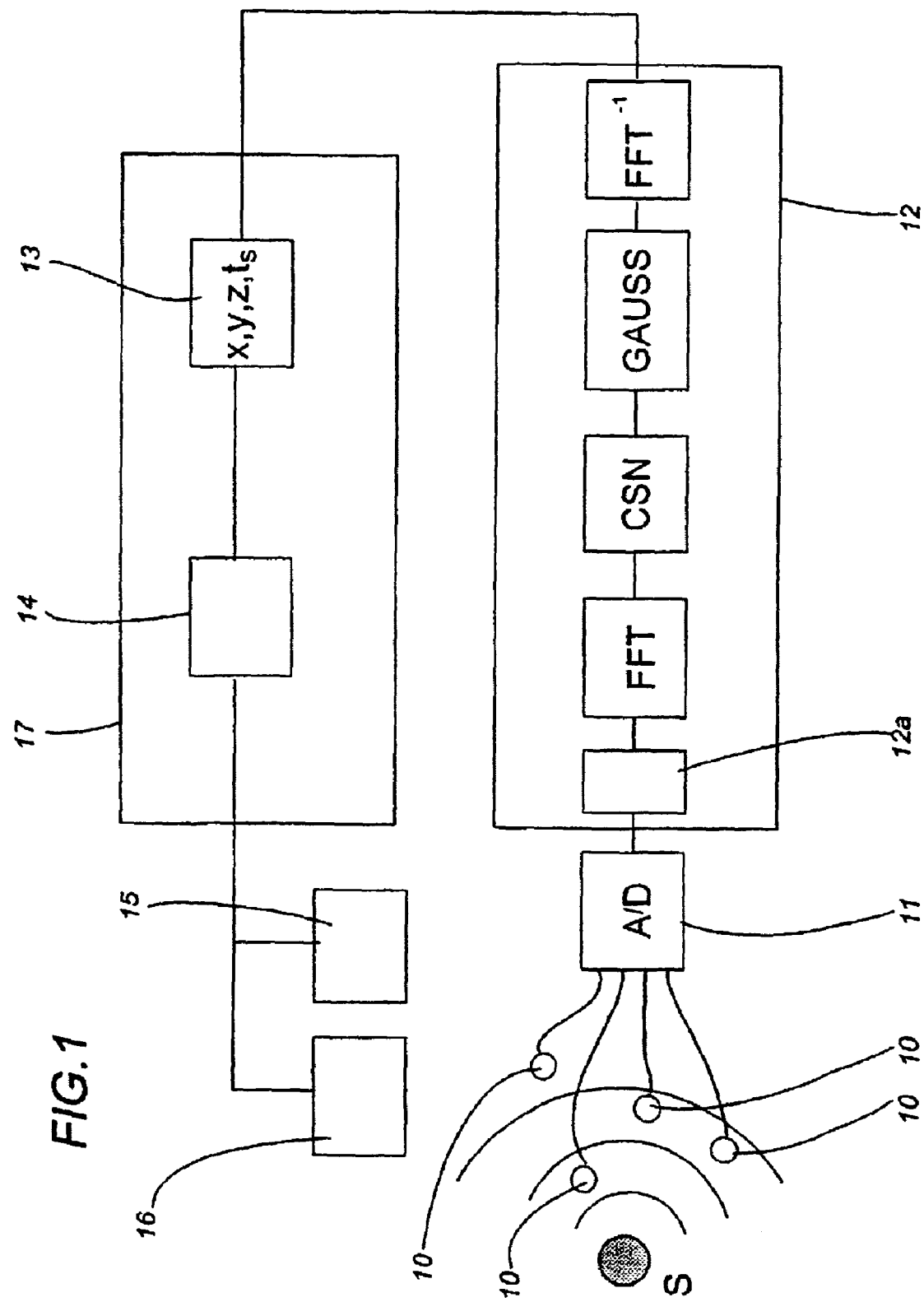

With reference to FIG. 1, an apparatus made according to the present invention essentially comprises the following:

a plurality of stationary microphones 10 for capturing a sound event produced by a source S;

a unit 11 for the analog-digital conversion and sampling of the signals generated by the microphones;

a module 12 for computing the delay time of arrival of the sound wavefront across select microphone pairs;

a module 13 for locating the sound event in space and time;

a module 14 for controlling one or more movable video cameras 15 and for dumping and managing the images produced by the cameras and, if necessary, by one one or more fixed video cameras 16.

Looking in more detail, the microphone system uses m omnidirectional microphones placed at points on the boundary of the volume under control so that all sounds produced from any point within that volume can be captured.

The number of microphones depends on the precision with which it is possible to determine their position and the arrival time of the acoustic signal and hence the precision with which the space-time coordinates of the sound event must be determined. In particular, if the location technique based on the above mentioned TLS method is used, the linear system (v) must be overdimensioned. In the case at hand, that means that the number of microphones must be m>5.

Figure 3:
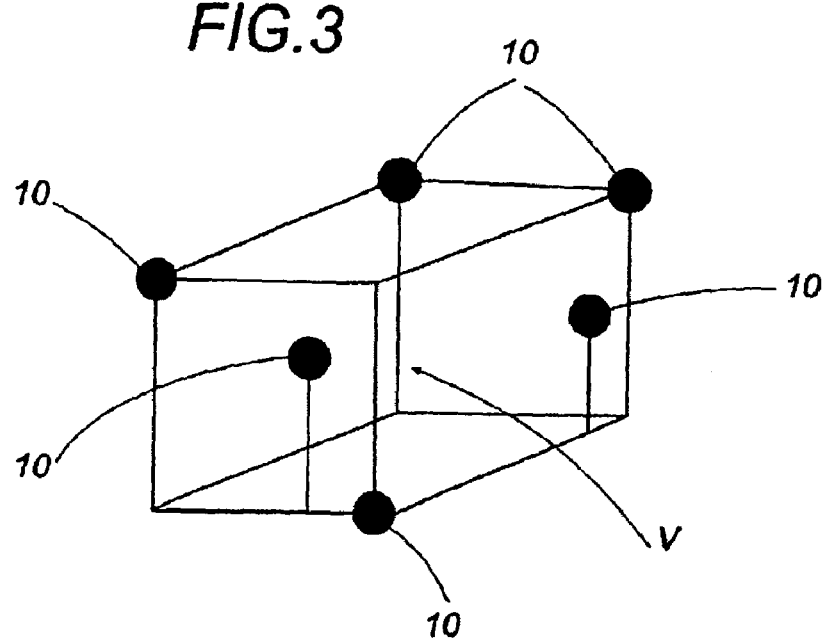
FIG. 3 shows a first preferred microphone array.

Furthermore, considering the matrix of the system, certain conditions on the location of the microphones in space must be satisfied to make the linear system consistent. In particular, the position of the source S must not coincide with that of a microphone and every set of three microphones must define different planes. In a particularly advantageous microphone arrangement (illustrated in FIG. 3, showing the volume V to be controlled), the number of non-parallel planes must be as high as possible.

Figure 4:
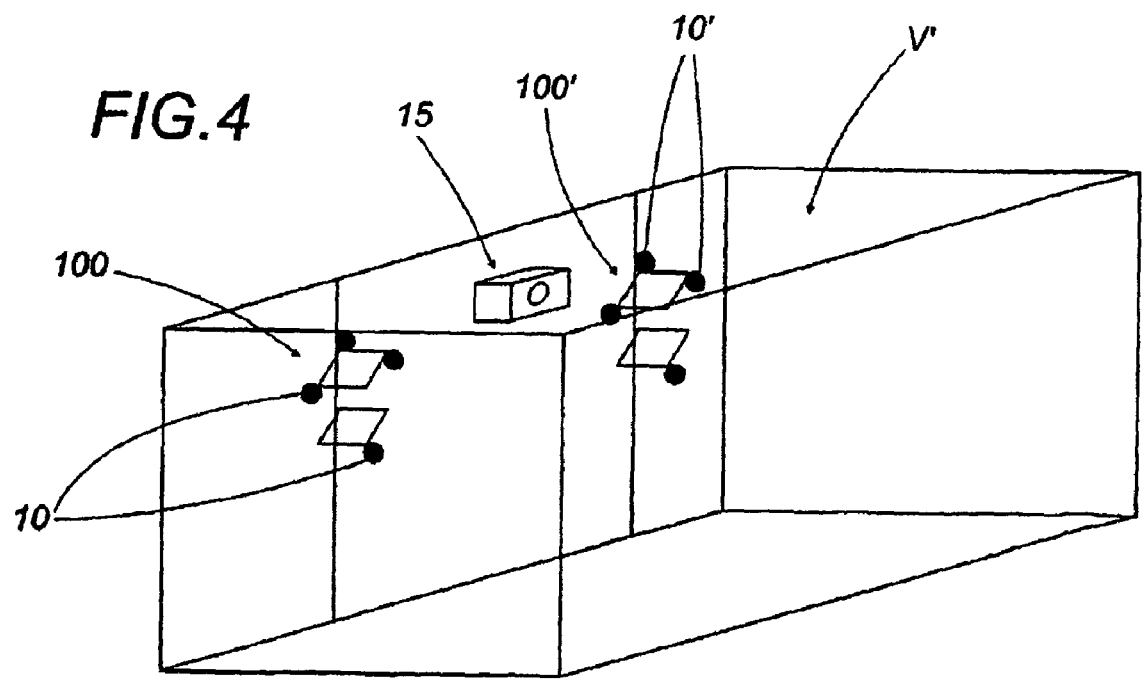
FIG. 4 shows a second preferred microphone array.

FIG. 4, on the other hand, shows a microphone array compatible with triangulation techniques for determining the position of the sound source within a space V'. As illustrated schematically in this figure, the array includes two sets (100, 100') of microphones, each consisting of four microphones (10, 10') placed in different planes. A pivotally mounted video camera (15) is located at the centre of mass of the microphone sets.

The signals captured by the microphones 10 are digitized and sampled (for example at 22 KHz) by the unit 11, which is connected to the module 12, which computes the time delay according to the procedure described above. In particular, the module 12, which may in practice consist of a digital signal processor (DSP) does the following:

- it filters the sampled data through the filter 12a (for example, with the appropriate base set for wavelet transform);
- it performs the Fast Fourier Transform (FFT) on the sampled signals;
- it computes the normalized cross-power spectrum (CSN)—that is to say, the phase—for each microphone pair, consisting of a reference microphone and each of the remaining microphones;
- it filters each normalized cross-power spectrum, that is to say, each phase extracted, using a Gaussian function $$e^{-\omega_k^2 2\sigma_\omega 2} \tag{vi}$$

where $\sigma_{107}$ is sufficiently small and preferably less than or equal to $\frac{1}{8}$ of the Fourier sampling interval, so as to satisfy the sampling theorem with a good approximation;

- it performs the inverse $FFT^{-1}$ of the filtered phase, generating a sequence that corresponds with the sampling, in the time domain, of the function (iv) which would be obtained in the continuous case, that is to say, a Gaussian function centred in $\Delta_{j1}$;
- it determines very accurately the position of the maximum by interpolation of the Gaussian function stored as a point table.

Using the procedure described above, running on freely available hardware, it is possible to make more than two time delay estimations per second, on eight microphones, with errors up to 50 times smaller than those obtained with standard techniques, under equal conditions of sampling frequency.

A DSP can be advantageously used to select signals above the ambient noise threshold and, in general, to perform standard prefiltering operations.

The time delays $\Delta_{j1}$ computed are then passed to the module 13 which determines the space-time coordinates of the sound event by applying the TLS method mentioned above.

In tests performed using commercially available hardware, the sound source was located in space and time, using six microphones, in less than a tenth of a second and with a maximum error of 1 m from the actual position, in a volume measuring 20×20×20 m³ and with errors in the estimation of microphone position and time of less than $10^{-4}$ m and $10^{-6}$ s, respectively.

The module 14 processes the space-time coordinates and generates commands applied to the motors of the movable video cameras 15 in order to focus on the source of the sound event in real time. The module 14 also manages the images captured, including those captured by the fixed video cameras 16, if any, by compressing, dumping and analyzing them off-line.

Advantageously, the module 13 for locating the sound source in space and time and the module 14 are best implemented in a personal computer 17 equipped, for example, with a Pentium® type microprocessor.

Figure 2:
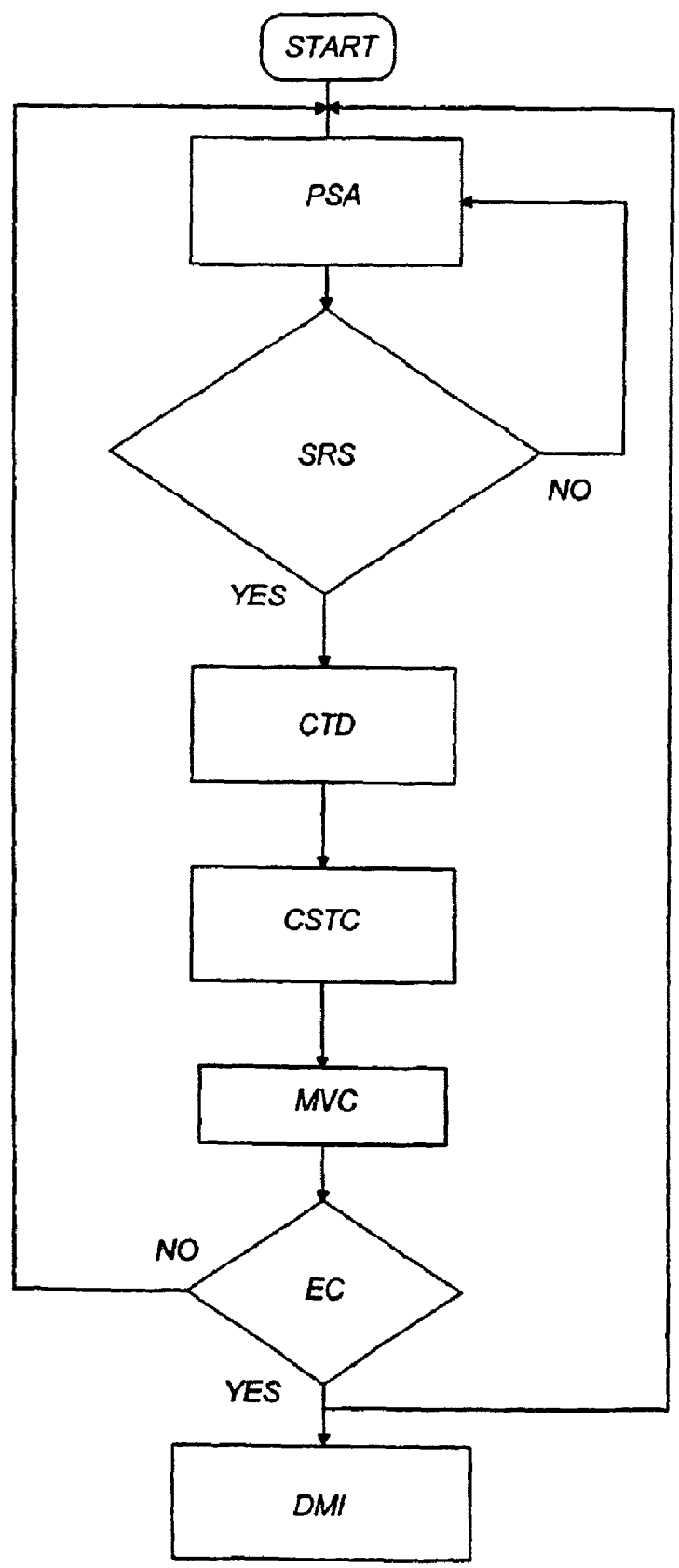
FIG. 2 is a flow chart which schematically illustrates the procedure disclosed.

A typical working sequence for controlling video cameras according to the present method is illustrated schematically in FIG. 2, where:

PSA=Periodic Sound Analysis;
SRS=Sound Recognition System (Is the sound one that the system must recognize?);
CTD=Compute Time Delay (Compute time delay between microphones);
CSTC=Compute Space-Time Coordinates (Compute space-time coordinates of the event);
MVC=Move Video Camera;
EC=Event Critical?
DMI=Dump/Manage Images.

What is claimed is:

1. A method for controlling movable video cameras (15) comprising the following steps:

setting up an array of microphones (10) to capture a sound event;

for each pair of microphones (j, 1) consisting of a selected microphone and each of the remaining microphones, performing a Fourier analysis to determine the normalized cross correlation (normalized cross-power spectrum) of the sampled signals, generated by the microphones $$\frac{S_i(\omega_k)S_j^*(\omega_k)}{|S_i(\omega_k)||S_j^*(\omega_k)|} = e^{-i\omega_k \Delta_{ij}}, k \in [-N/2, +N/2] \tag{ii}$$

where N is the number of samples;

filtering the normalized cross-power spectrum using a normalized function tending to zero on the boundary;

performing the inverse transform on the normalized, filtered cross-power spectrum;

estimating, for each pair of microphones, the delay time $\Delta_{j1}$ of arrival of the sound wavefront on the microphones, by determining in the time domain the maximum value of the inverse transform function;

determining the space-time coordinates of the sound event by solving the linear equation system $$A\xi = b, A \in R^{m \times 4}, \xi \in R^4, b \in R^m, m \geq 5 \tag{v}$$

directing the video cameras (15) at the point whose space coordinates are those determined by solving the equation system (v).

2. The method according to claim 1, characterized in that the normalized function tending smoothly to zero on the boundary is a Gaussian function $$e^{-\omega_k^2 2\sigma_\omega^2} \tag{vi}$$

where $\sigma_\omega$ is preferably less than or equal to $\frac{1}{8}$ of the Fourier sampling interval.

3. The method according to claim 2, characterized in that the linear equation system (v) is solved by the Total Least Squares (TLS) technique, the number of microphones being greater than 5.

4. The method according to claim 2, characterized in that the space coordinates of the sound event are determined b triangulation techniques, the number of microphones being not less than eight.

5. The method according to claim 2, characterized in that it further comprises the step of dumping the images captured by the video camera (15).

6. The method according to claim 1 or 2, characterized in that the linear equation system (v) is solved by the Total Least Squares (TLS) technique, the number of microphones being greater than 5.

7. The method according to claim 6, characterized in that it further comprises the step of dumping the images captured by the video camera (15).

8. The method according to claim 1 or 2, characterized in that the space coordinates of the sound event are determined by triangulation techniques, the number of microphones being not less than eight.

9. The method according to claim 8, characterized in that it further comprises the step of dumping the images captured by the video camera (15).

10. The method according to any of the claims from 1 to 8, characterized in that it further comprises the step of dumping the images captured by the video cameras (15).

11. An apparatus for controlling motor-driven video cameras (15) comprising:
- a plurality of microphones (10) for capturing a sound event;
- means (11) for the analog-digital conversion and sampling of the signals generated by the microphones (10);
- means (12) for computing, for each pair of microphones (j, 1) consisting of a selected microphone and each of the remaining microphones, the delay time $\Delta_{j1}$ of arrival of the sound wavefront on the microphones by:
  performing the Fourier transform, to determine the normalized cross correlation (ii) (normalized cross-power spectrum) of the signals sampled for the microphones (j, 1);
  multiplying the normalized cross-power spectrum by a normalized function tending smoothly to zero on the boundary;
  computing the inverse Fourier transform of the normalized cross-power spectrum and the normalized function tending smoothly to zero on the boundary;
  determining in the time domain the maximum value of the inverse transform function;
- means (13) for determining the space-time coordinates of the sound event by solving the equation system (v);
- means (14) for directing the video cameras (15) at the point whose space coordinates are those determined by solving the equation system (v).

12. The apparatus according to claim 11, characterized in that the normalized function tending smoothly to zero on the boundary is a Gaussian function (vi) where $\sigma_\omega$ is preferably less than or equal to ⅛ of the Fourier sampling interval.

13. The apparatus according to claim 12, characterized in that the linear equation system (v) is solved by the Total Least Squares (TLS) technique and in that the number of microphones is greater than five.

14. The apparatus according to claim 12, characterized in that the means (13) determine the space coordinates of the sound event by triangulation techniques and in that the microphones are not less than eight in number.

15. The apparatus according to claim 12, characterized in that the means (12) for estimating the delay time $\Delta_{ij}$ consist of a digital signal processor (DSP) and in that the means (13, 14) for determining the space-time coordinates of the sound event and directing the video cameras (15) consist of a personal computer (17).

16. The apparatus according to claim 11 or 12, characterized in that the linear equation system (v) is solved by the Total Least Squares (TLS) technique and in that the number of microphones is greater than five.

17. The apparatus according to claim 16, characterized in that the microphones are six in number, arranged in such a way that each set of three microphones forms a plane and in such a way that the number of non-parallel planes is as high as possible.

18. The apparatus according to claim 11 or 12, characterized in that the means (13) determine the space coordinates of the sound event by triangulation techniques and in that the microphones are not less than eight in number.

19. The apparatus according to claim 18, characterized in that the microphones are eight in number, divided into two sets (100, 100') each consisting of four microphones (10, 10') placed in different planes and in that a pivotally mounted video camera (15) is located at the centre of mass of the microphone sets.

20. The apparatus according to any of the foregoing claims from 11 to 19, characterized in that the means (12) for estimating the delay time $\Delta_{j1}$ consist of a digital signal processor (DSP) and in that the means (13, 14) for determining the space-time coordinates of the sound event and directing the video cameras (15) consist of a personal computer (17).

* * * * *